US012015940B2

(12) United States Patent
Nakano et al.

(10) Patent No.: US 12,015,940 B2
(45) Date of Patent: Jun. 18, 2024

(54) RECEPTION APPARATUS, ANTENNA CONTROL METHOD, AND COMMUNICATION SYSTEM

(71) Applicant: SONY SEMICONDUCTOR SOLUTIONS CORPORATION, Kanagawa (JP)

(72) Inventors: Hiroaki Nakano, Kanagawa (JP); Osamu Kozakai, Kanagawa (JP); Masahiro Uno, Kanagawa (JP); Yuji Murayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 326 days.

(21) Appl. No.: 17/422,320

(22) PCT Filed: Dec. 27, 2019

(86) PCT No.: PCT/JP2019/051626
§ 371 (c)(1),
(2) Date: Jul. 12, 2021

(87) PCT Pub. No.: WO2020/153105
PCT Pub. Date: Jul. 30, 2020

(65) Prior Publication Data
US 2022/0104042 A1  Mar. 31, 2022

(30) Foreign Application Priority Data
Jan. 21, 2019 (JP) .................... 2019-008079

(51) Int. Cl.
*H04W 24/08* (2009.01)
*H04W 48/16* (2009.01)

(52) U.S. Cl.
CPC .......... *H04W 24/08* (2013.01); *H04W 48/16* (2013.01)

(58) Field of Classification Search
CPC ........ H04W 24/08; H04W 48/16; H04B 1/30; H04B 7/0814
See application file for complete search history.

(56) References Cited

U.S. PATENT DOCUMENTS

| | | | |
|---|---|---|---|
| 9,143,189 B2* | 9/2015 | Wang | H04B 7/0865 |
| 2008/0318541 A1* | 12/2008 | Kimoto | A61B 1/041 |
| | | | 455/277.1 |
| 2009/0312604 A1 | 12/2009 | Kimoto et al. | |
| 2015/0207553 A1 | 7/2015 | Watanabe | |

(Continued)

FOREIGN PATENT DOCUMENTS

| | | |
|---|---|---|
| CN | 101252874 A | 8/2008 |
| CN | 101268634 A | 9/2008 |

(Continued)

OTHER PUBLICATIONS

International Search Report and Written Opinion of PCT Application No. PCT/JP2019/051626, dated Feb. 25, 2020, 09 pages of ISRWO.

*Primary Examiner* — Kibrom T Hailu
(74) *Attorney, Agent, or Firm* — CHIP LAW GROUP

(57) ABSTRACT

A reception apparatus (10) includes plural antennas (101, 102) that are compatible with an LTE communication scheme and one reception processing section (100) processing a reception signal acquired by any one of the plural antennas (101, 102).

7 Claims, 12 Drawing Sheets

(56) References Cited

U.S. PATENT DOCUMENTS

| | | | | |
|---|---|---|---|---|
| 2015/0358979 A1* | 12/2015 | Puranik | ............... | H04W 72/542 |
| | | | | 455/452.2 |
| 2016/0036508 A1* | 2/2016 | Szini | ...................... | H04B 17/00 |
| | | | | 375/227 |
| 2019/0149425 A1* | 5/2019 | Larish | .................... | H04L 43/08 |
| | | | | 706/16 |

FOREIGN PATENT DOCUMENTS

| | | | |
|---|---|---|---|
| CN | 104584453 | A | 4/2015 |
| EP | 1920705 | A1 | 5/2008 |
| EP | 1928107 | A1 | 6/2008 |
| JP | 6-014011 | A | 1/1994 |
| JP | 2005-260502 | A | 9/2005 |
| JP | 2007-088860 | A | 4/2007 |
| JP | 2015-159373 | A | 9/2015 |
| JP | 2016-127487 | A | 7/2016 |
| JP | 2019-009624 | A | 1/2019 |
| KR | 10-2015-0038462 | A | 4/2015 |
| WO | 2007/026890 | A1 | 3/2007 |
| WO | 2007/034890 | A1 | 3/2007 |
| WO | 2014/030183 | A1 | 2/2014 |
| WO | 2015/125391 | A1 | 8/2015 |

\* cited by examiner

FIG.3

| OUTPUT LEVEL (dBm) | THROUGHPUT (%) | SIGNAL QUALITY VALUE ||||
|---|---|---|---|---|---|
| | | RSRP | RSRQ | SINR | RSSI |
| -52 | 99.91 | -113.7 | -16.8 | 4.3 | -96.7 |
| -54 | 99.96 | -115.9 | -17.8 | 1.2 | -97.8 |
| -56 | 99.94 | -121.2 | -21.7 | -2.1 | -99.4 |
| -58 | 98.08 | -124.8 | -22.9 | -4.1 | -100.5 |
| -60 | 76.94 | -131 | -29.4 | -6.9 | -101.4 |
| -62 | 23.76 | -133.4 | -30.7 | -11.2 | -102.5 |
| -64 | 2.17 | -138.4 | -35.8 | -9.7 | -102.4 |
| -66 | No Detect |||||

|  | LTE Cat-4 | LTE Cat-M1 | LTE NB-IoT |
|---|---|---|---|
| MAXIMUM COMMUNICATION SPEED (DOWNLINK) | 150Mbps | 1Mbps | 1Mbps |
| MAXIMUM COMMUNICATION SPEED (UPLINK) | 50Mbps | 1Mbps | 1Mbps |
| DUPLEX OPERATION | FULL DUPLEX/ HALF DUPLEX | FULL DUPLEX/ HALF DUPLEX | HALF DUPLEX |
| TERMINAL OPERATING BANDWIDTH | 20MHz | 1.4MHz | 180KHz |
| TERMINAL MAXIMUM OUTPUT LEVEL | 23dBm | 20 or 23dBm | 23dBm |
| MODEM COMPLEXITY (REFERENCE VALUE) | 100% | 20-25% | 10% |

RECEPTION APPARATUS, ANTENNA CONTROL METHOD, AND COMMUNICATION SYSTEM

CROSS REFERENCE TO RELATED APPLICATIONS

This application is a U.S. National Phase of International Patent Application No. PCT/JP2019/051626 filed on Dec. 27, 2019, which claims priority benefit of Japanese Patent Application No. JP 2019-008079 filed in the Japan Patent Office on Jan. 21, 2019. Each of the above-referenced applications is hereby incorporated herein by reference in its entirety.

TECHNICAL FIELD

The present disclosure relates to a reception apparatus, an antenna control method, and a communication system.

BACKGROUND ART

Efforts have been made to apply a wireless communication system using LTE (Long Time Evolution) to IoT (Internet of Things) such as a smart meter, environmental monitoring, and automotive telematics. Efforts have been made to realize standardization and practical use of an LTE communication scheme applied to IoT, such as a CAT-M1 scheme or an NB (Narrow Band)-IoT scheme.

In this regard, a technique in which an antenna is switched at a terminal or a base station to prevent degradation of communication quality is known.

CITATION LIST

Patent Literature

[PTL 1]
JP 2016-127487A
[PTL 2]
JP 2005-260502A

SUMMARY

Technical Problem

When LTE communication is applied to IoT, periodic, long-term communication may be expected. In this case, power consumption can be reduced by simplifying a circuit configuration of a reception apparatus. On the other hand, the simplified configuration of the circuit of the reception apparatus may eliminate the effect of diversity of reception, preventing changes in an environment of a transmission path from being dealt with. This may lead to degraded communication quality.

Thus, the present disclosure proposes a reception apparatus, an antenna control method, and a communication system that can deal with changes in communication environment while reducing power consumption.

Solution to Problem

To solve the above-described problem, a reception apparatus in a form according to the present disclosure includes plural antennas that are compatible with an LTE communication scheme and one reception processing section that processes a reception signal acquired by any one of the plural antennas.

BRIEF DESCRIPTION OF DRAWINGS

FIG. 3 is a diagram depicting an example of measurement results for respective signal quality values for each throughput corresponding to an output level according to the first embodiment of the present disclosure.

DESCRIPTION OF EMBODIMENTS

Embodiments of the present disclosure will be described below in detail on the basis of the drawings. Note that, in the embodiments described below, the same sections are denoted by the same reference signs and duplicate descriptions may be omitted.

Additionally, the present disclosure will be described in the order of items described below.

1. First Embodiment
   1-1. Configuration of Communication System According to First Embodiment
   1-2. Configuration of Reception Apparatus According to First Embodiment
   1-3. Procedure of Antenna Switching Processing According to First Embodiment
2. Second Embodiment
   2-1. Procedure of Antenna Switching Processing According to Second Embodiment
3. Third Embodiment
   3-1. Configuration of Reception Apparatus According to Third Embodiment 3-2. Procedure of Antenna Switching Processing According to Third Embodiment
4. Other Embodiments
5. Effects Produced by Reception Apparatus According to Present Disclosure
6. Hardware Configuration

1. First Embodiment

1-1. Configuration of Communication System According to First Embodiment

Figure 1:
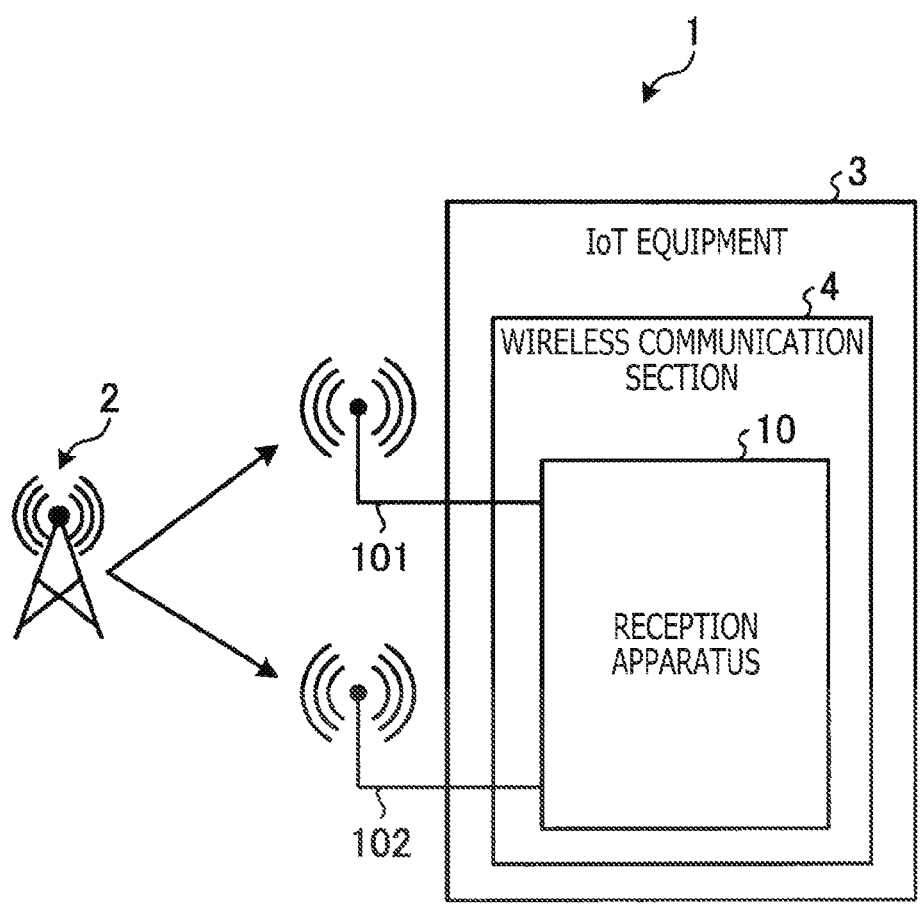
FIG. 1 is a diagram depicting an example of a communication system according to a first embodiment of the present disclosure.

FIG. 1 is a diagram depicting an example of a communication system 1 according to a first embodiment of the present disclosure. The communication system 1 depicted in FIG. 1 is an IoT system in which communication using an LTE communication scheme (hereinafter referred to as "LTE communication") is used for IoT. The communication system 1 includes a base station 2 and IoT equipment 3.

The base station 2 is an apparatus that transmits and receives wireless signals in LTE communication. The IoT equipment 3 is equipment that performs LTE communication by transmitting and receiving wireless signals to and from the base station 2. The IoT equipment 3 includes a wireless communication section 4, and the wireless communication section 4 includes a reception apparatus 10.

The reception apparatus 10 is an apparatus that processes wireless signals in LTE communication received from the base station 2. The reception apparatus 10 includes a first antenna 101 and a second antenna 102 that are compatible with LTE communication.

Figures 11, 12:
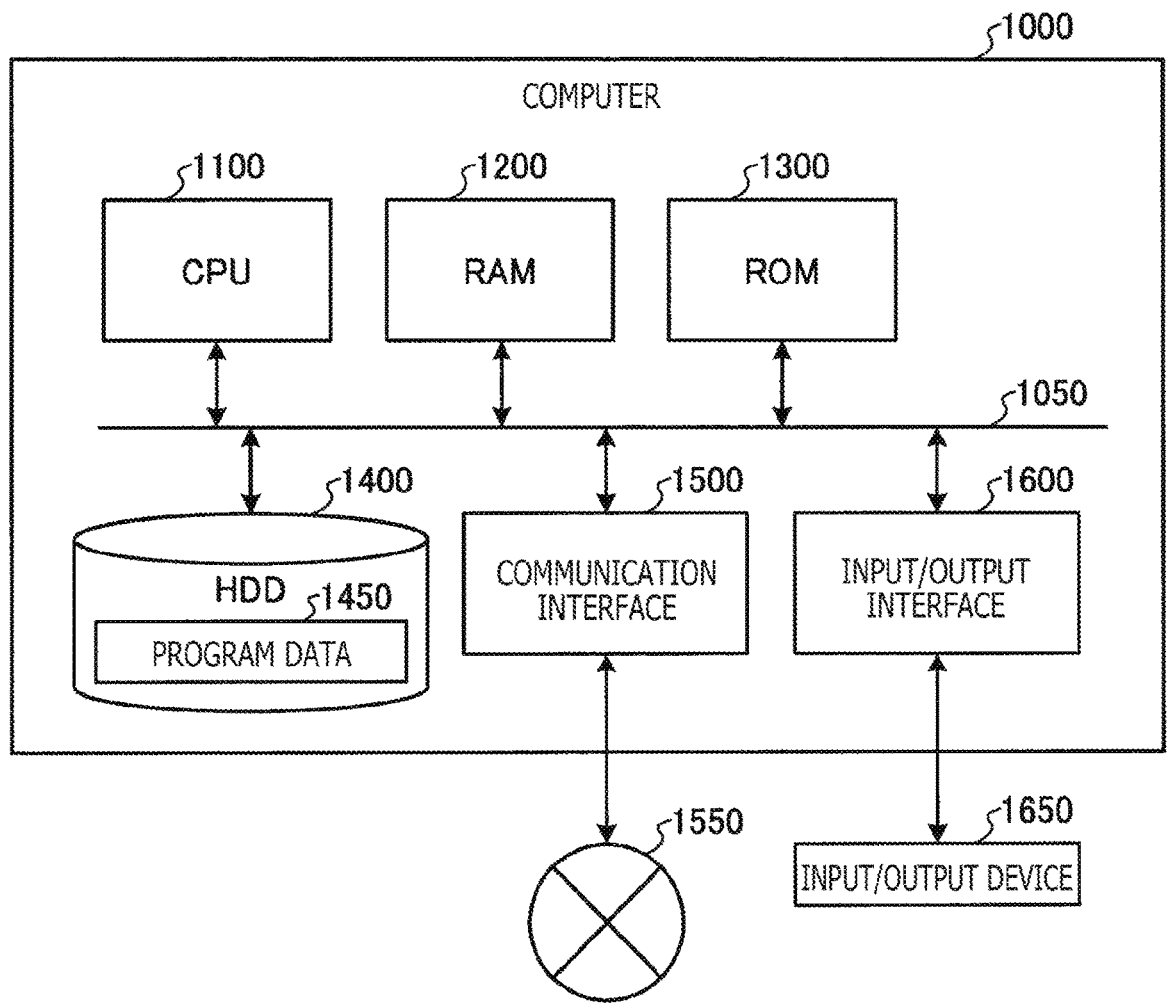
FIG. 11 is a hardware configuration diagram depicting an example of a computer implementing functions of the reception apparatus.
FIG. 12 is a diagram depicting an example of specifications of an LTE communication scheme.

FIG. 12 is a diagram depicting an example of specifications of an LTE communication scheme. "Cat-4" depicted in FIG. 12 indicates specifications generally used for smartphones. "Cat-M1" and "NB-IoT" depicted in FIG. 12 indicate specifications generally used for IoT equipment.

As depicted in FIG. 12, the specifications of the LTE communication scheme used for the IoT equipment are focused on reduction of power consumption and decrease of model complexity by narrowing a terminal operating bandwidth (channel bandwidth) and decreasing maximum communication speed (transmission rate). On the other hand, in a case where the LTE communication scheme is applied to a moving body as in automotive telematics, communication is expected to be difficult to perform in a case of using the specifications depicted in FIG. 12 as the LTE communication scheme used for IoT equipment. Similarly, in a case where the LTE communication scheme is applied to a smart meter or environmental monitoring that involves poor visibility from the base station and that is significantly affected by fluctuations in external environment, multipath, and the like, communication is expected to be difficult to perform in a case of using the specifications indicated in FIG. 12.

Figure 13:
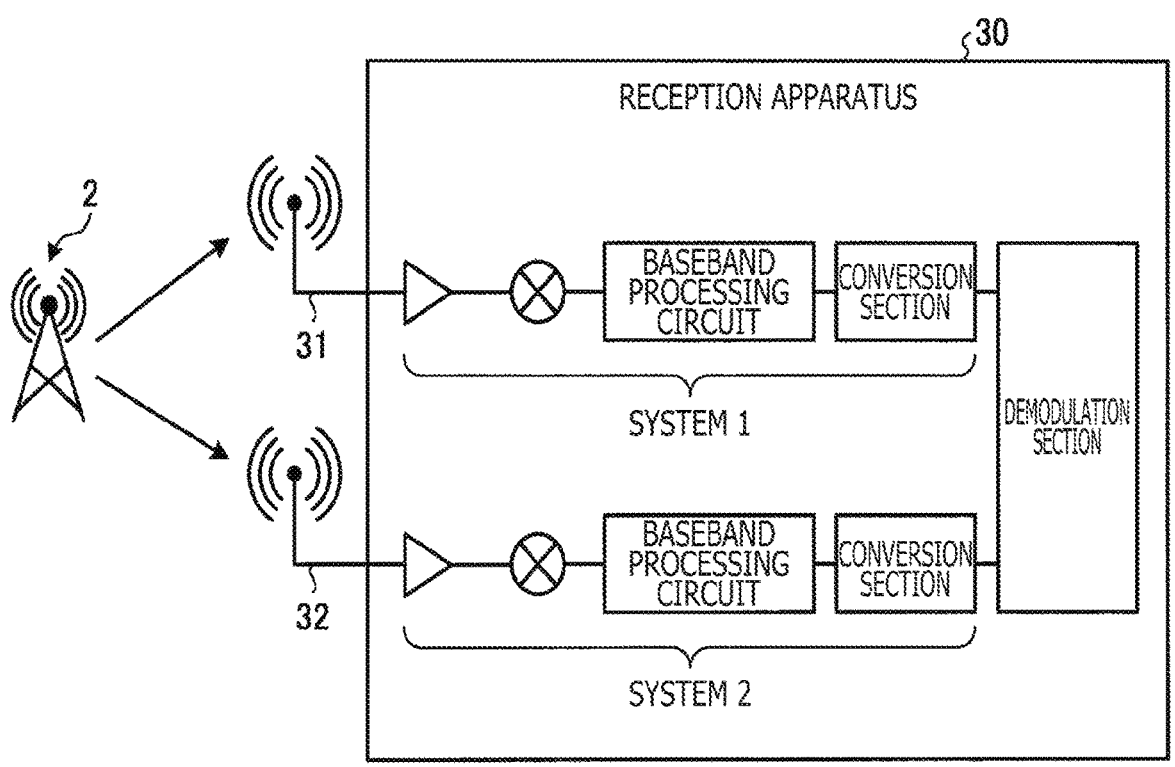
FIG. 13 is a diagram depicting an example of a reception diversity configuration.

One typical technique for dealing with such a problem is diversity involving plural antennas used to receive radio waves. Diversity is a technique for receiving radio waves through plural antennas and selecting or synthesizing a high-quality reception signal to prevent a decrease in reception level. FIG. 13 is a diagram depicting a configuration example of a reception apparatus 30 according to a comparative example. As depicted in FIG. 13, for the reception apparatus 30 according to the comparative example, a diversity configuration using an antenna 31 and an antenna 32 is adopted. The reception apparatus 30 includes the antenna 31 and the antenna 32 receiving radio waves from the base station 2. Additionally, the reception apparatus 30 includes a dual-system processing circuit including a circuit (system 1) that processes a reception signal acquired by the antenna 31 and a circuit (system 2) that processes a reception signal acquired by the antenna 32. Further, the reception apparatus 30 can select or synthesize an appropriate reception signal from the reception signals acquired by the antenna 31 and the antenna 32.

The diversity described above enables prevention of a decrease in reception level. However, the diversity requires, for the antennas, the respective processing circuits that process reception signals, and thus, power consumption becomes a problem. For example, in a case where LTE communication is used for IoT equipment such as a smart meter, which is expected to perform long-term, periodic communication, power consumption needs to be reduced by making the circuit configuration of the reception apparatus as simple as possible.

Thus, the first embodiment of the present disclosure proposes the reception apparatus 10 that has resistance to changes in an environment of a transmission path while reducing power consumption. A configuration of the reception apparatus 10 according to the first embodiment will be specifically described below.

1-2. Configuration of Reception Apparatus According to First Embodiment

Figure 2:
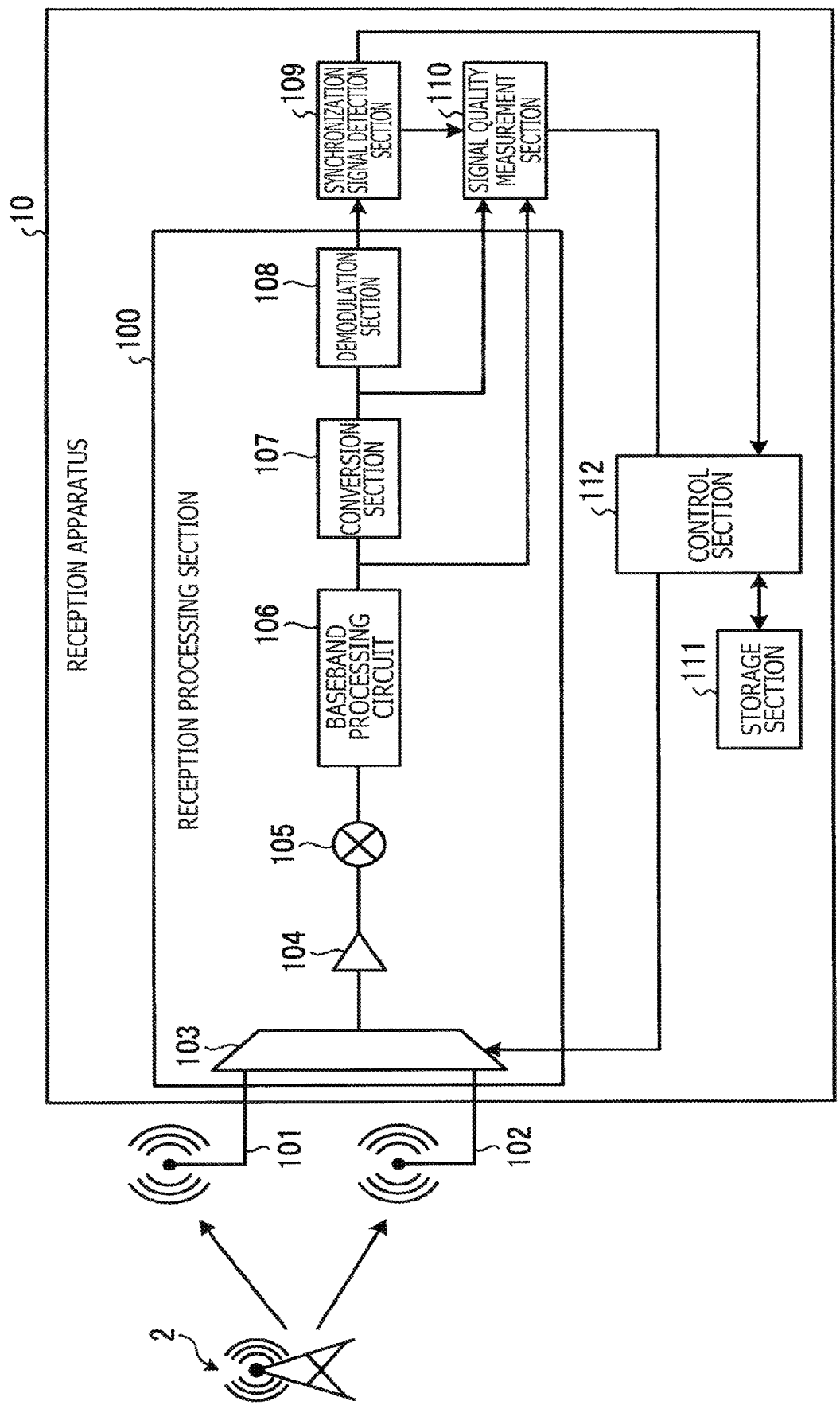
FIG. 2 is a diagram depicting a configuration example of a reception apparatus according to the first embodiment of the present disclosure.

FIG. 2 is a diagram depicting a configuration example of the reception apparatus 10 according to the first embodiment of the present disclosure. The reception apparatus 10 includes a reception processing section 100, the first antenna 101, the second antenna 102, a synchronization signal detection section 109, a signal quality measurement section 110, a storage section 111, and a control section 112.

The first antenna 101 (an example of the first antenna) and the second antenna 102 (an example of the second antenna) are apparatuses that receive radio waves compatible with the LTE communication scheme. An example of the LTE communication scheme may be a low-speed communication scheme equivalent to a CAT-M1 scheme and an NB-IoT scheme. The first antenna 101 and the second antenna 102 acquire reception signals by converting radio waves received from the base station 2 into electric signals. The first antenna 101 and the second antenna 102 input the reception signals acquired to the reception apparatus 10. When powered on, the reception apparatus 10 connects to any one of the first antenna 101 and the second antenna 102 and waits.

The reception processing section 100 connected to the first antenna 101 and the second antenna 102 includes a selector 103, an amplifier 104, a mixer 105, a baseband processing section 106, a conversion section 107, and a demodulation section 108. The reception processing section 100 processes reception signals acquired by the first antenna 101 or the second antenna 102. The reception processing section 100 includes a single-system processing circuit including, for the first antenna 101 and the second antenna 102, one selector 103, one amplifier 104, one mixer 105, one baseband processing section 106, one conversion section 107, and one demodulation section 108.

The selector 103 switches to any one of the first antenna 101 and the second antenna 102 according to a control signal from the control section 112.

The baseband processing section 106 converts, into a baseband signal, a reception signal acquired via the amplifier 104 and the mixer 105. The baseband processing section 106 may convert, into a baseband signal, a wireless signal amplified by the amplifier 104 and subjected to frequency conversion by the mixer 105. However, a direct conversion scheme may be used to convert a wireless signal directly into a baseband signal.

The conversion section 107 converts a baseband signal corresponding to an analog signal into a baseband signal corresponding to a digital signal.

The demodulation section 108 executes demodulation processing on a downlink signal from the base station 2 to the reception apparatus 10. In other words, the demodulation section 108 uses a predetermined modulation scheme on a demodulation symbol of the downlink signal, to demodulate the baseband signal converted into a digital signal. An example of the predetermined modulation scheme may be QPSK (Quadrature Phase shift Keying), 16 QAM (Quadrature Amplitude Modulation), or the like.

The synchronization signal detection section 109 detects a cell within a network in an initial stage before LTE communication is started and detects a synchronization signal used during an initial cell search performed to synchronize with the base station 2. The initial cell search includes a primary (initial) synchronization sequence using a primary synchronization signal (PSS) and a secondary synchronization sequence using a secondary synchronization signal (SSS).

When the synchronization signal detection section 109 described below detects a synchronization signal and predetermined communication is started, the signal quality measurement section 110 measures the quality of a reception signal. Specifically, the signal quality measurement section 110 uses, as a trigger, the detection, by the synchronization signal detection section 109, of the synchronization signal used during the initial cell search, to calculate a signal quality value indicative of the quality of the reception signal acquired by the antenna used during the initial cell search. The signal quality measurement section 110 outputs the signal quality value calculated to the control section 112.

The signal quality measurement section 110 calculates the signal quality value on the basis of the analog signal acquired from the baseband processing section 106 or the digital signal acquired from the conversion section 107. The signal quality measurement section 110 can calculate the signal quality value on the basis of, for example, a calculation result obtained using an RSSI (Received Signal Strength Indicator) value. Additionally, the signal quality measurement section 110 can calculate the signal quality value on the basis of a calculation result obtained using an RSRP (Reference Signal Received Power) value. In addition, the signal quality measurement section 110 can calculate the signal quality value on the basis of a calculation result obtained using an RSRQ (Reference Signal Received Quality) value. Additionally, the signal quality measurement section 110 can calculate the signal quality value on the basis of a calculation result obtained using an SINR (Signal to Interference plus Noise Ratio) value. The signal quality measurement section 110 can also calculate the signal quality value on the basis of a calculation result obtained using at least one of the RSSI value, the RSRP value, the RSRQ value, and the SINR value. In addition, the signal quality measurement section 110 can calculate the signal quality value on the basis of a calculation result obtained using at least one of a value associated with the RSSI value, a value associated with the RSRP value, a value associated with the RSRQ value, and a value associated with the SINR value. The RSRP value, the RSRQ value, the SINR value, and the RSSI value illustrated as the indicators of the signal quality value are only illustrative, and any other indicators may be used.

Additionally, in response to receiving, from the control section 112, a control signal instructing re-measurement of the signal quality value, the signal quality measurement section 110 calculates the signal quality value again. The signal quality measurement section 110 outputs the signal quality value calculated again to the control section 112.

The storage section 111 stores programs and data used for control by the control section 112. The storage section 111 is implemented by, for example, a semiconductor memory element such as a RAM or a flash memory or a storage apparatus such as a hard disk or an optical disc. The storage section 111 can store a predetermined threshold to be compared, by the control section 112, with the signal quality value calculated by the signal quality measurement section 110.

FIG. 3 is a diagram depicting an example of measurement results for respective signal quality values for each throughput corresponding to an output level according to the first embodiment of the present disclosure. As depicted in FIG. 3, the throughput remained at approximately the same level while an output level of a transmission side ranged from "−52 (dbm)" to "−58 (dbm)." Then, when the output level of the transmission side was lower than "−60 (dbm)," the throughput also started to decrease. The throughput corresponding to the output level of the transmission side of "−62 (dbm)" decreased down to 23.76%, which is approximately one-third of the throughput at "−60 (dbm)." Then, the throughput corresponding to the output level of the transmission side of "−66 (dbm)" was 0%. Additionally, a decrease in the output level of the transmission side consistently reduced all of the signal quality values including the RSRP value, the RSRQ value, the SINR value, and the RSSI value.

On the basis of the measurement results indicated in FIG. 3, a predetermined threshold for antenna switching can be set according to the throughput required by the IoT equipment 3. For example, in a case where the throughput required by the IoT equipment 3 is approximately 20%, the predetermined threshold corresponding to the RSRP value can be set to "−133." Likewise, in a case where the throughput required by the IoT equipment 3 is approximately 20%, the predetermined threshold corresponding to the RSRQ value can be set to "−30." Likewise, in a case where the throughput required by the IoT equipment 3 is approximately 20%, the predetermined threshold corresponding to the SINR value can be set to "−11." Likewise, in a case where the throughput required by the IoT equipment 3 is approximately 20%, the predetermined threshold corresponding to the RSSI value can be set to "−102."

The control section 112 controls the sections of the reception apparatus 10. The control by the control section 112 is implemented, for example, by a CPU, an MPU, or the like by executing programs stored inside the reception apparatus 10 (for example, programs recorded in the storage section 111) with use of a RAM or the like as a work area. The control by the control section 112 may also be implemented, for example, by an integrated circuit such as an ASIC or an FPGA.

When, for example, the reception apparatus 10 is powered on, the control section 112 optionally selects any one of the first antenna 101 and the second antenna 102 as an antenna used at the start of the initial cell search. The control section 112 connects to the selected antenna and waits. Subsequently, when the synchronization signal detection section 109 detects the synchronization signal used during the initial cell search, the control section 112 starts predetermined communication and determines whether or not the signal quality value acquired from the signal quality measurement section 110 is less than a predetermined threshold. In a case where the signal quality value acquired from the signal quality measurement section 110 is less than the predetermined threshold, the control section 112 outputs an antenna switching signal to the selector 103. For example, in a case of being connected to the first antenna 101 at the start of the initial cell search, the control section 112 outputs, to the selector 103, a switching signal requesting switching from the first antenna 101 to the second antenna 102.

Note that, in a case where the signal quality value is equal to or greater than the predetermined threshold, the control section 112 does not perform switching between the antennas. The reception apparatus 10 continues the communication using the antenna to which the reception apparatus 10 is currently connected.

After performing switching between the antennas, the control section 112 outputs, to the signal quality measurement section 110, a control signal instructing re-measurement of the signal quality value. Then, the control section 112 compares the signal quality value acquired from the signal quality measurement section 110 after the antenna switching, with the signal quality value acquired before the antenna switching. In a case where the signal quality value acquired after the antenna switching is less than the signal quality value acquired before the antenna switching, the control section 112 outputs the antenna switching signal to the selector 103 again and performs switching between the antennas. In a case where the signal quality value measured after switching to the second antenna 102 is less than the signal quality value measured before switching to the second antenna 102, the control section 112 performs switching from the second antenna 102 to the first antenna 101 again. In other words, in a case where the quality of the reception signal is degraded after switching from the first antenna 101 to the second antenna 102, the control section 112 switches back to the first antenna 101, which has provided reception signals of a better quality as compared to the second antenna 102.

Note that, in a case where the signal quality value acquired after the antenna switching is equal to or greater than the signal quality value acquired before the antenna switching, the control section 112 does not perform switching between the antennas. The reception apparatus 10 continues the communication using the antenna to which the reception apparatus 10 is currently connected.

The sections of the reception apparatus 10 depicted in FIG. 2, that is, the reception processing section 100, the synchronization signal detection section 109, the signal quality measurement section 110, the storage section 111, and the control section 112, are functional blocks indicating the functions of the reception apparatus 10. The functional blocks may be software blocks or hardware blocks. For example, the above-described functional blocks may each be one software module implemented by software (including a microprogram) or one circuit block on a semiconductor chip (die). Needless to say, each functional block may be one processor or one integrated circuit. Any configuration method may be used for the functional blocks. Note that the control section 112 may include functional units different from the above-described functional blocks. For example, the functions implemented by the synchronization signal detection section 109 and the signal quality measurement section 110 may be implemented by respective software modules executed by the control section 112. Alternatively, the functions implemented by the synchronization signal detection section 109 and the signal quality measurement section 110 may be implemented by one circuit block or one integrated circuit.

1-3. Procedure of Antenna Switching Processing According to First Embodiment

Figure 4:
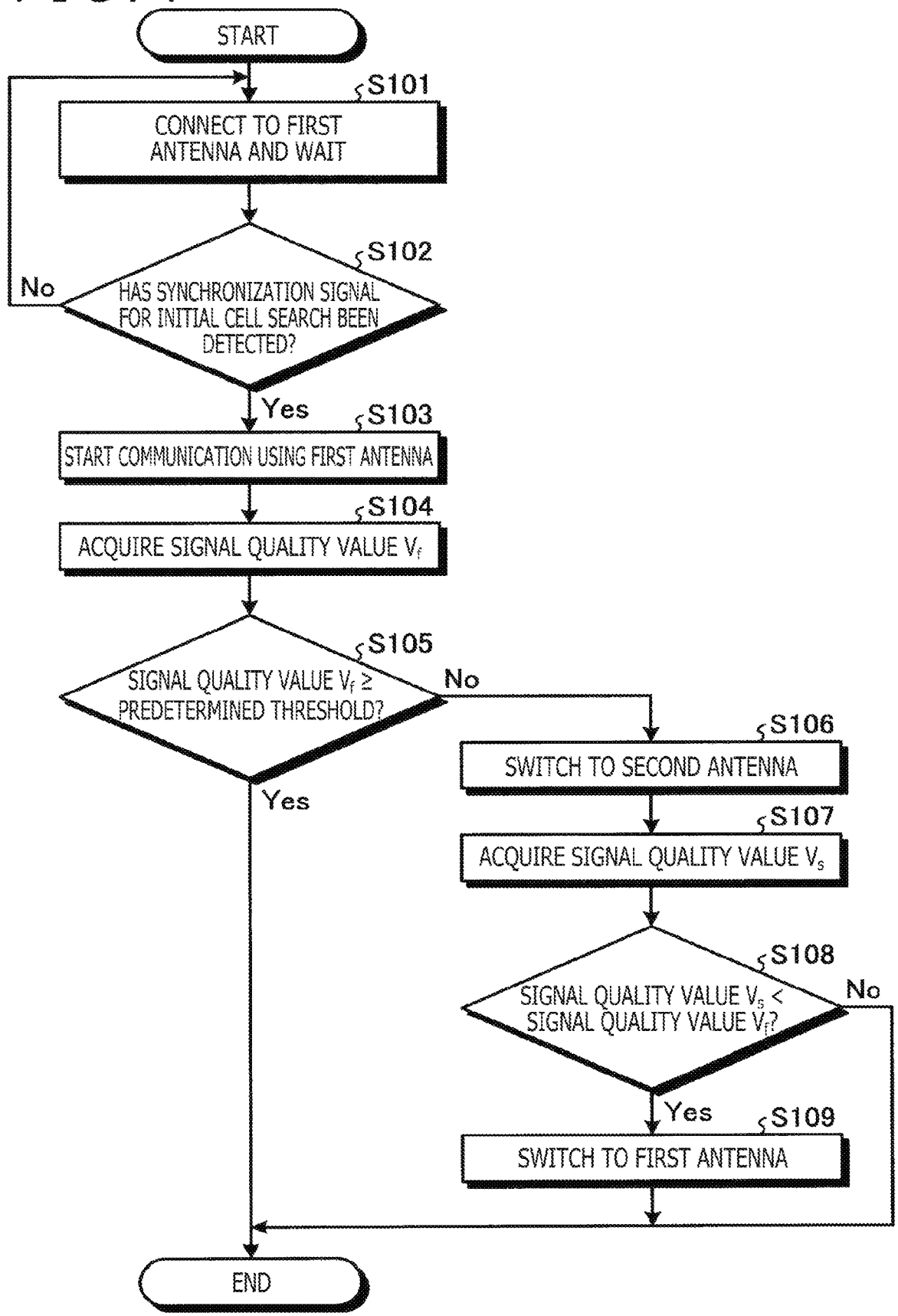
FIG. 4 is a flowchart depicting a flow of antenna switching processing according to the first embodiment of the present disclosure.

FIG. 4 is a flowchart depicting a flow of antenna switching processing according to the first embodiment of the present disclosure. The processing depicted in FIG. 4 is executed by the control section 112, for example, in response to power-on of the reception apparatus 10.

As depicted in FIG. 4, the control section 112 connects to the first antenna 101 optionally selected and waits (step S101).

Subsequently, the control section 112 determines whether or not the synchronization signal for the initial cell search has been detected by the synchronization signal detection section 109 (step S102).

In a case where the result of the determination indicates that the synchronization signal for the initial cell search has not been detected by the synchronization signal detection section 109 (step S102, No), the control section 112 returns to the procedure in step S101 described above. In contrast, when the result of the determination indicates that the synchronization signal for the initial cell search has been detected by the synchronization signal detection section 109 (step S102, Yes), the control section 112 starts the predetermined communication through the first antenna 101 (step S103).

Subsequently, the control section 112 acquires a signal quality value $V_f$ from the signal quality measurement section 110 (step S104). The signal quality value $V_f$ indicates a reception signal acquired using the first antenna 101.

Subsequently, the control section 112 determines whether or not the signal quality value $V_f$ is equal to or greater than a predetermined threshold (step S105).

In a case where the result of the determination indicates that the signal quality value $V_f$ is equal to or greater than the predetermined threshold (step S105, Yes), the control section 112 ends the processing depicted in FIG. 4 without performing switching between the antennas.

On the other hand, in a case where the result of the determination indicates that the signal quality value $V_f$ is not equal to or greater than the predetermined threshold (step S105, No), that is, the signal quality value $V_f$ is less than the predetermined threshold, the control section 112 outputs the switching signal to the selector 103 to switch to the second antenna 102 (step S106).

Subsequently, the control section 112 acquires a signal quality value $V_s$ again from the signal quality measurement section 110 (step S107). The signal quality value $V_s$ indicates a reception signal acquired using the second antenna 102.

Subsequently, the control section 112 determines whether or not the signal quality value $V_s$ is less than the signal quality value $V_f$ (step S108).

In a case where the result of the determination indicates that the signal quality value $V_s$ is less than the signal quality value $V_f$ (step S108, Yes), the control section 112 outputs the switching signal to the selector 103 to switch to the first antenna 101 again (step S109). The control section 112 then ends the processing depicted in FIG. 4.

On the other hand, in a case where the result of the determination indicates that the signal quality value $V_s$ is not less than the signal quality value $V_f$ (step S108, No), that is, the signal quality value $V_s$ is equal to or greater than the signal quality value $V_f$, the control section 112 ends the processing depicted in FIG. 4 without performing switching between the antennas.

2. Second Embodiment

2-1. Procedure of Antenna Switching Processing According to Second Embodiment In the first embodiment, when the initial cell search is started, any one of the first antenna 101 and the second antenna 102 is optionally selected and determined to be the antenna used at the start of the initial cell search. For example, in a case where initial synchronization performance is a bottleneck on the whole communication, it is possible that the effect of antenna switching would not be produced.

Figure 5:
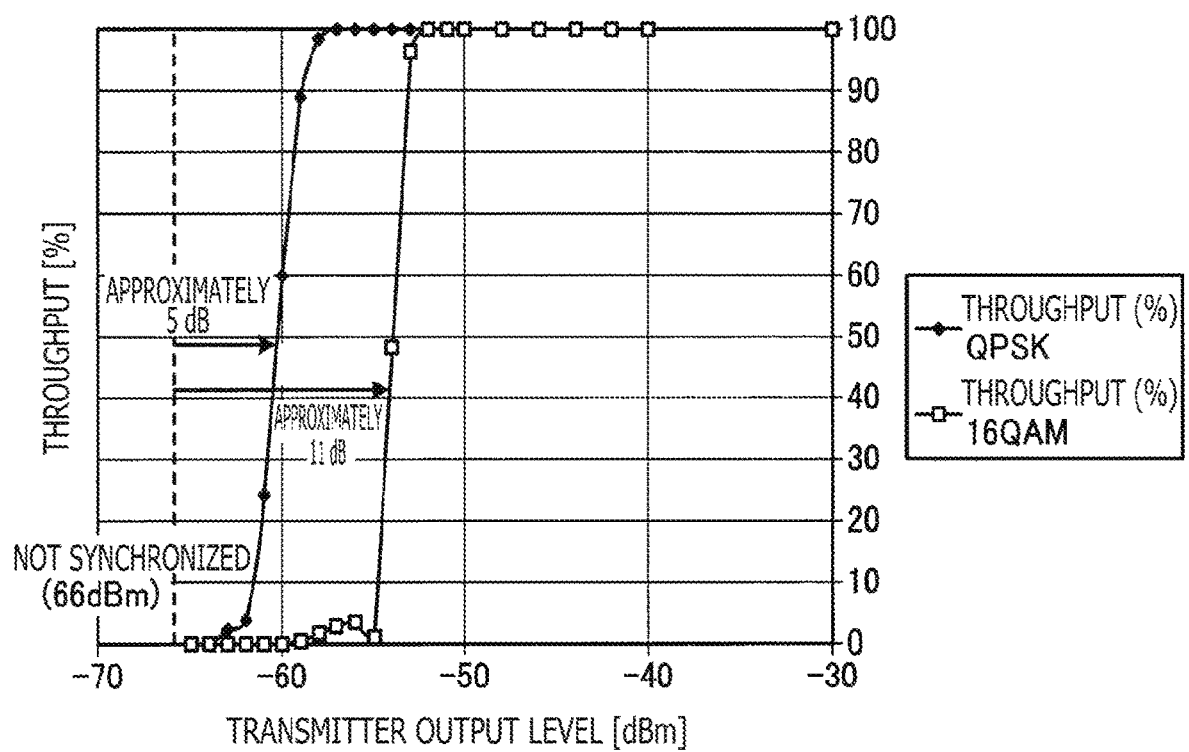
FIG. 5 is a diagram depicting an example of measurement results for throughputs corresponding to respective modulation schemes according to a second embodiment of the present disclosure.

FIG. 5 is a diagram depicting an example of measurement results for throughputs corresponding to respective modulation schemes according to a second embodiment of the present disclosure. FIG. 5 depicts synchronization characteristics observed when a tester is transmitted wirelessly and the output level is varied, and also depicts the measurement results for throughputs of downlink signals corresponding to the modulation schemes (QPSK or 16QAM). Note that "Cat-M1" is adopted as the LTE communication scheme.

As depicted in FIG. 5, as the output level is reduced, the throughputs of the modulation schemes all decrease. Each modulation scheme is subjected to loss of synchronism at an output level of approximately "−66 (dbm)." There is a difference of approximately "5 (dbm)" in the case of QPSK or approximately "11 (dbm)" in the case of 16QAM between the output level measured when the throughput is equal to or less than 50% and the output level measured when synchronism is lost. In other words, the measurement results depicted in FIG. 5 indicate that it is possible that the throughput becomes 0% even if synchronization is established.

Thus, in the antenna switching processing according to the second embodiment described below, a procedure for setting a reference antenna (an example of a reference antenna) is further executed. In other words, after synchronization is established, the signal quality value is measured. At a timing when the quality of the reception signal can no longer be maintained, antenna switching is performed. This allows an antenna with the quality of the reception signal maintained to be set as an antenna to be initially connected at the next initial cell search, enabling an increase in the possibility of dealing with gradual changes in the environment of the transmission path.

Figure 6:
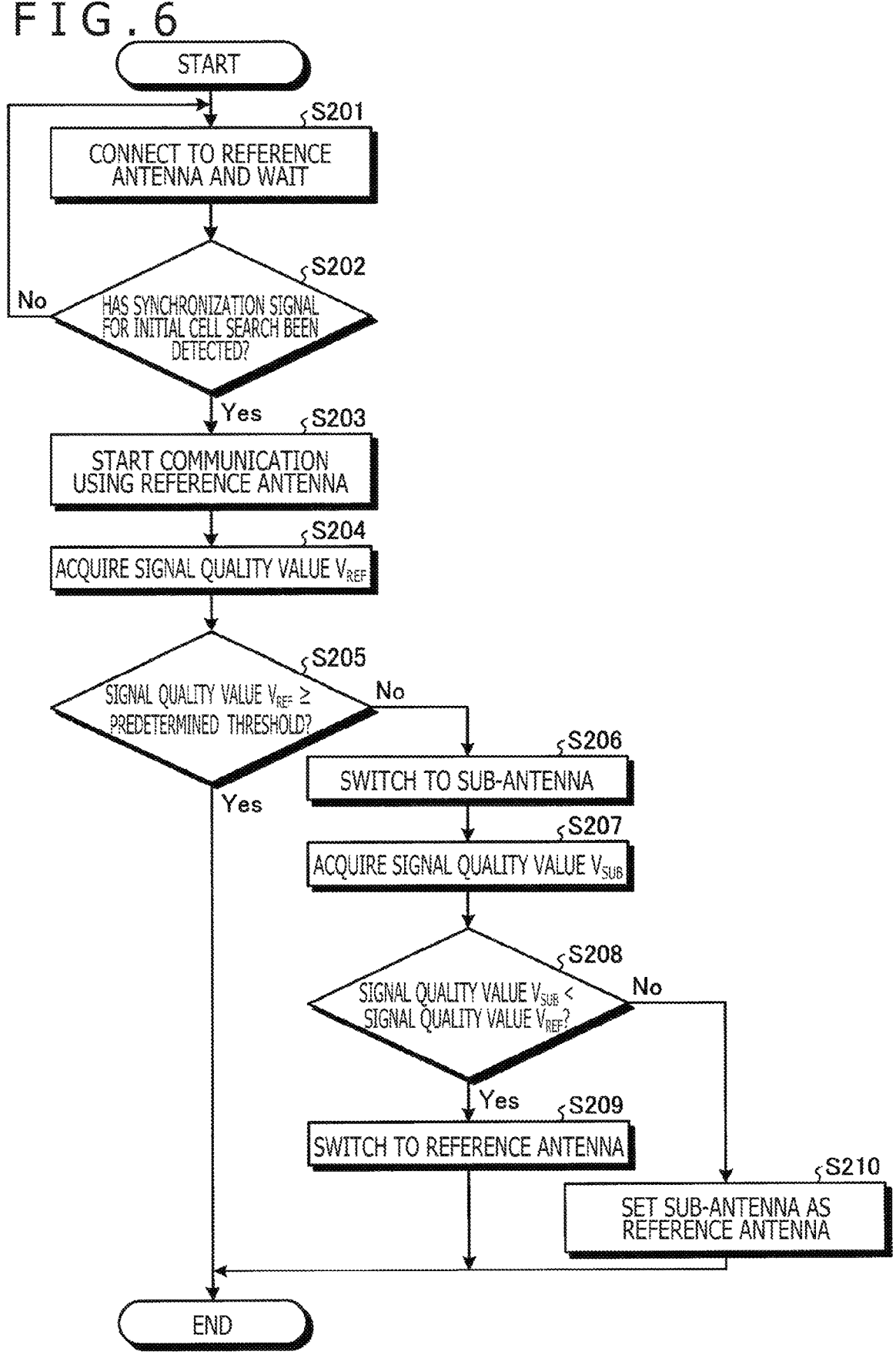
FIG. 6 is a flowchart depicting a flow of antenna switching processing according to the second embodiment of the present disclosure.

FIG. 6 is a flowchart depicting a flow of the antenna switching processing according to the second embodiment of the present disclosure. The antenna switching processing according to the second embodiment is basically similar to the antenna switching processing according to the first embodiment (FIG. 3) except that the antenna switching processing according to the second embodiment includes a procedure for setting the reference antenna. In the description below, the reference antenna corresponds to any one of the first antenna 101 and the second antenna 102. Additionally, in the description below, a sub-antenna corresponds to an antenna that is not the reference antenna, that is, any one of the first antenna 101 and the second antenna 102.

As depicted in FIG. 6, the control section 112 connects to the reference antenna and waits (step S201). The storage section 111 can store status information indicating which of, for example, the first antenna 101 and the second antenna 102 corresponds to the reference antenna. The control section 112 can identify, as the reference antenna, one of the first antenna 101 and the second antenna 102 on the basis of the status information stored in the storage section 111.

Subsequently, the control section 112 determines whether or not the synchronization signal for the initial cell search has been detected by the synchronization signal detection section 109 (step S202).

In a case where the result of the determination indicates that the synchronization signal for the initial cell search has not been detected by the synchronization signal detection section 109 (step S202, No), the control section 112 returns to the procedure in step S201 described above. In contrast, when the result of the determination indicates that the synchronization signal for the initial cell search has been detected by the synchronization signal detection section 109 (step S202, Yes), the control section 112 starts predetermined communication using the reference antenna (step 203).

Subsequently, the control section 112 acquires a signal quality value $V_{REF}$ from the signal quality measurement section 110 (step S204). The signal quality value $V_{REF}$ indicates a reception signal acquired using the reference antenna.

Subsequently, the control section 112 determines whether or not the signal quality value $V_{REF}$ is equal to or greater than the predetermined threshold (step S205).

In a case where the result of the determination indicates that the signal quality value $V_{REF}$ is equal to or greater than the predetermined threshold (step S205, Yes), the control section 112 ends the processing depicted in FIG. 6 without performing switching between the antennas.

On the other hand, in a case where the result of the determination indicates that the signal quality value $V_{REF}$ is not equal to or greater than the predetermined threshold (step S205, No), that is, the signal quality value $V_{REF}$ is less than the predetermined threshold, the control section 112 outputs the switching signal to the selector 103 to switch to the sub-antenna (step S206).

Subsequently, the control section 112 acquires a signal quality value $V_{SUB}$ from the signal quality measurement section 110 (step S207). The signal quality value $V_{SUB}$ indicates a reception signal acquired using the sub-antenna.

Subsequently, the control section 112 determines whether or not the signal quality value $V_{SUB}$ is less than the signal quality value $V_{REF}$ (step S208).

In a case where the result of the determination indicates that the signal quality value $V_{SUB}$ is less than the signal quality value $V_{REF}$ (step S208, Yes), the control section 112 outputs the switching signal to the selector 103 to switch to the reference antenna again (step S209). The control section 112 then ends the processing depicted in FIG. 6.

On the other hand, in a case where the result of the determination indicates that the signal quality value $V_{SUB}$ is not less than the signal quality value $V_{REF}$ (step S208, No), the control section 112 sets the sub-antenna as the reference antenna (step 210) and then ends the processing depicted in FIG. 6.

3. Third Embodiment

3-1. Configuration of Reception Apparatus According to Third Embodiment

In the above-described embodiment, described is the example in which, in response to detection of the synchronization signal used during the initial cell search, antenna switching is passively performed. However, a sudden change in the environment of the transmission path may cause loss of synchronism with the base station 2. Thus, in a third embodiment described below, the reception apparatus 10 that actively performs switching between the antennas is proposed in order to deal with a sudden change in the environment of the transmission path.

Figure 7:
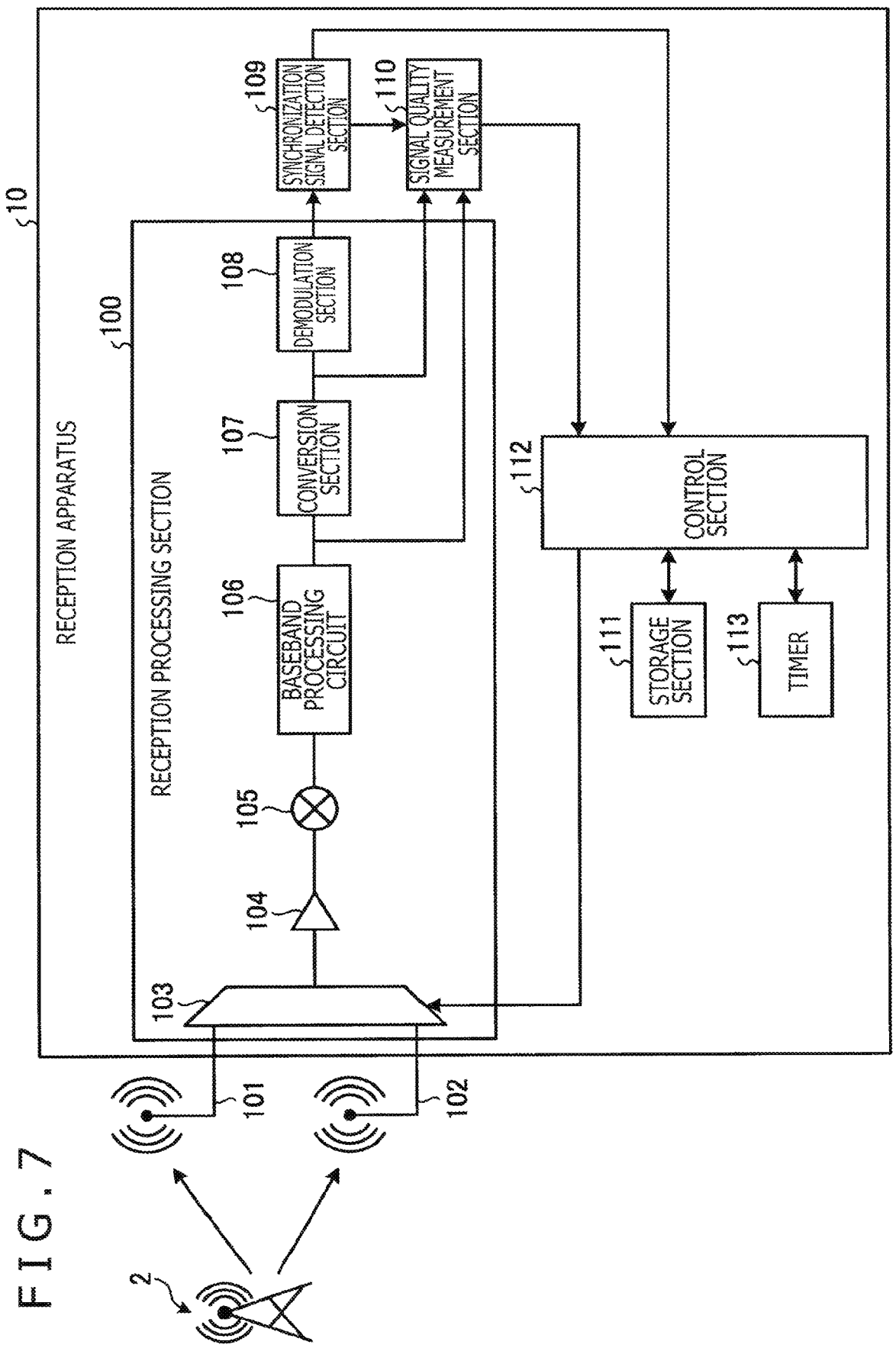
FIG. 7 is a diagram depicting a configuration example of a reception apparatus according to a third embodiment of the present disclosure.

FIG. 7 is a diagram depicting a configuration example of the reception apparatus 10 according to the third embodiment of the present disclosure. The reception apparatus 10 according to the third embodiment differs from the reception apparatuses according to the above-described embodiments in that the reception apparatus 10 according to the third embodiment includes a timer 113.

The timer 113 connects to the reference antenna or the sub-antenna and measures the time for waiting. The timer 113 outputs a measurement result to the control section 112.

The storage section 111 stores a threshold used to determine whether or not the time measured by the timer 113 is within a preset, predetermined period of time.

The control section 112 connects to the reference antenna and waits for the synchronization signal detection section 109 to detect the synchronization signal used during the initial cell search. Then, in a case where no synchronization signal is detected within a given period of time, the control section 112 resets the timer 113, switches to the sub-antenna, and waits for the synchronization signal to be detected. The control section 112 alternately switches between the reference antenna and the sub-antenna until the synchronization signal is detected. A procedure for antenna switching processing according to the third embodiment will be described below with reference to the drawings.

Figure 8:
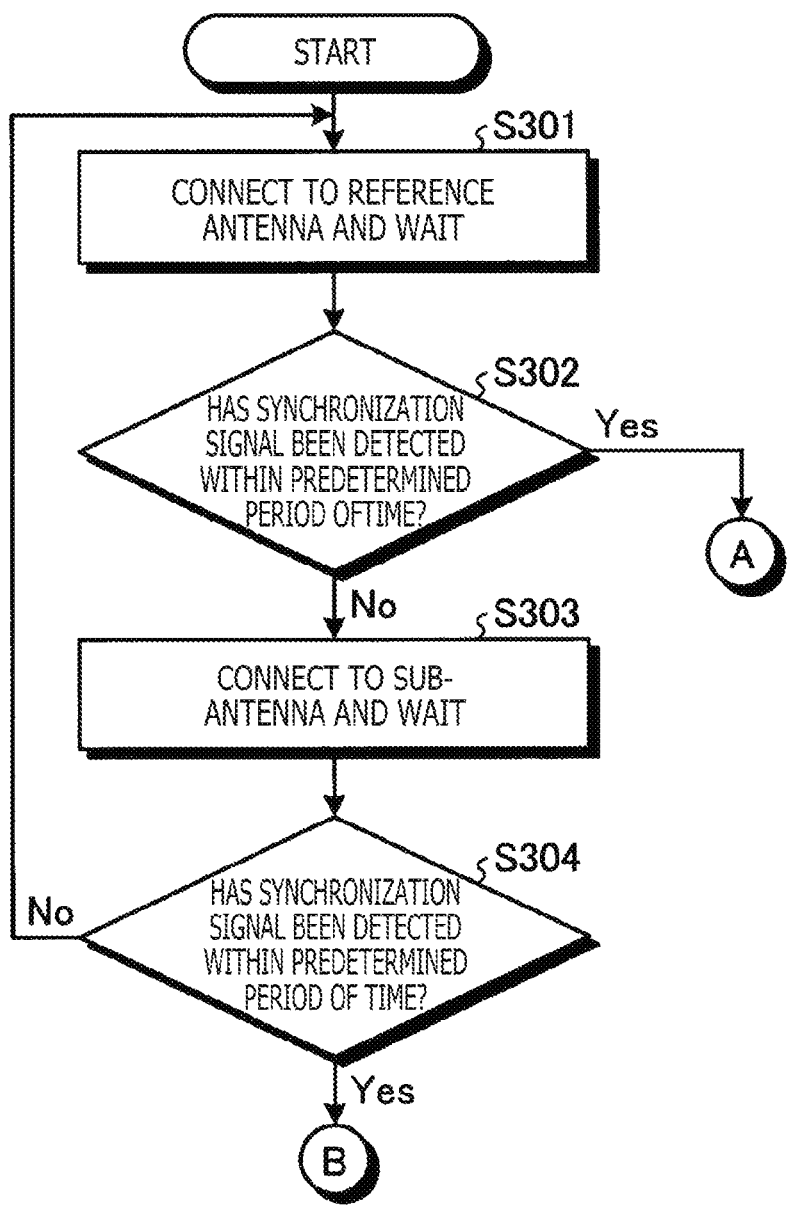
FIG. 8 is a flowchart depicting a flow of antenna switching processing according to the third embodiment of the present disclosure.
Figure 9:
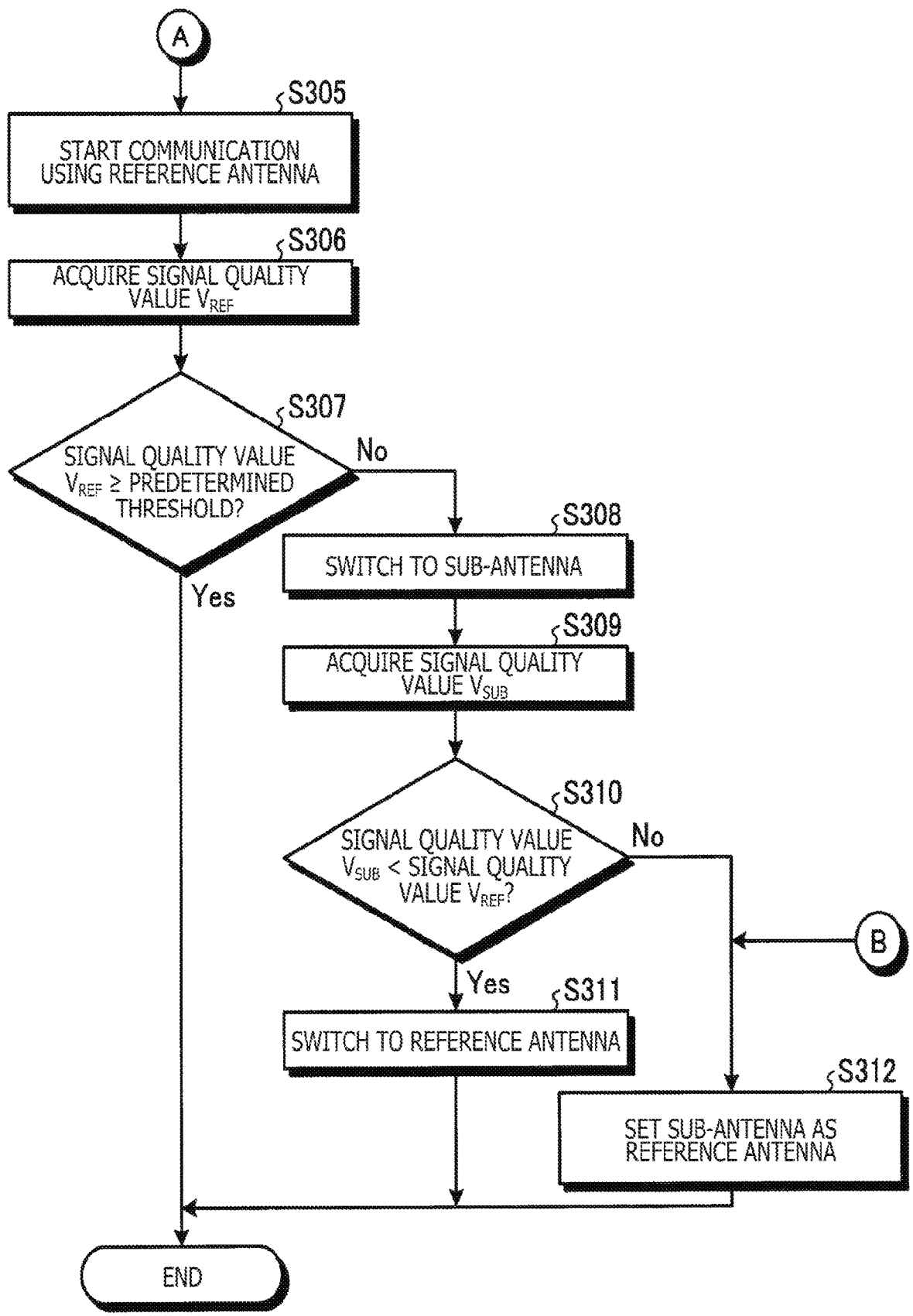
FIG. 9 is a flowchart depicting the flow of the antenna switching processing according to the third embodiment of the present disclosure.

3-2. Procedure for Antenna Switching Processing According to Third Embodiment FIG. 8 and FIG. 9 are flowcharts depicting a flow of antenna switching processing according to the third embodiment of the present disclosure. The processing procedure depicted in FIG. 9 is similar to steps S203 to S210 depicted in FIG. 6.

As depicted in FIG. 8, the control section 112 connects to the reference antenna and waits (step S301). The storage section 111 can store status information indicating which of, for example, the first antenna 101 and the second antenna 102 corresponds to the reference antenna. The control section 112 can identify, as the reference antenna, one of the first antenna 101 and the second antenna 102 on the basis of the status information stored in the storage section 111.

Subsequently, the control section 112 determines whether or not the synchronization signal for the initial cell search has been detected within a predetermined period of time by the synchronization signal detection section 109 (step S302).

In a case where the result of the determination indicates that the synchronization signal for the initial cell search has not been detected within the predetermined period of time (step S302, No), the control section 112 switches to the sub-antenna and connects to the sub-antenna and waits (step S303).

Then, the control section 112 determines again whether or not the synchronization signal for the initial cell search has been detected within the predetermined period of time by the synchronization signal detection section 109 (step S304).

In a case where the result of the determination indicates that the synchronization signal for the initial cell search has not been detected within the predetermined period of time (step S304, No), the control section 112 switches to the reference antenna and returns to the procedure in step S301 described above.

In step S302 described above, in a case where the result of the determination indicates that the synchronization signal for the initial cell search has been detected within the predetermined period of time (step S302, Yes), the control section 112 shifts to step S305 and a processing procedure following step S305 as depicted in FIG. 9. The processing procedure depicted in steps S305 to S312 depicted in FIG. 9 is similar to that in steps S203 to S210 depicted in FIG. 6 and will thus not be described.

Additionally, in step S304 described above, in a case where the result of the determination indicates that the synchronization signal for the initial cell search has been detected within the predetermined period of time (step S304, Yes), the control section 112 shifts to the processing procedure in step S312 depicted in FIG. 9.

4. Other Embodiments

In the above-described embodiments, described is the example in which the reception apparatus 10 performs switching between the antennas on the basis of the signal quality value of the reception signal. However, the embodiments need not be particularly limited to the example, and antenna switching may be performed according to a throughput. For example, in a case where communication using the first antenna 101 has a throughput less than a predetermined threshold, the control section 112 may switch to the second antenna 102.

Figure 10:
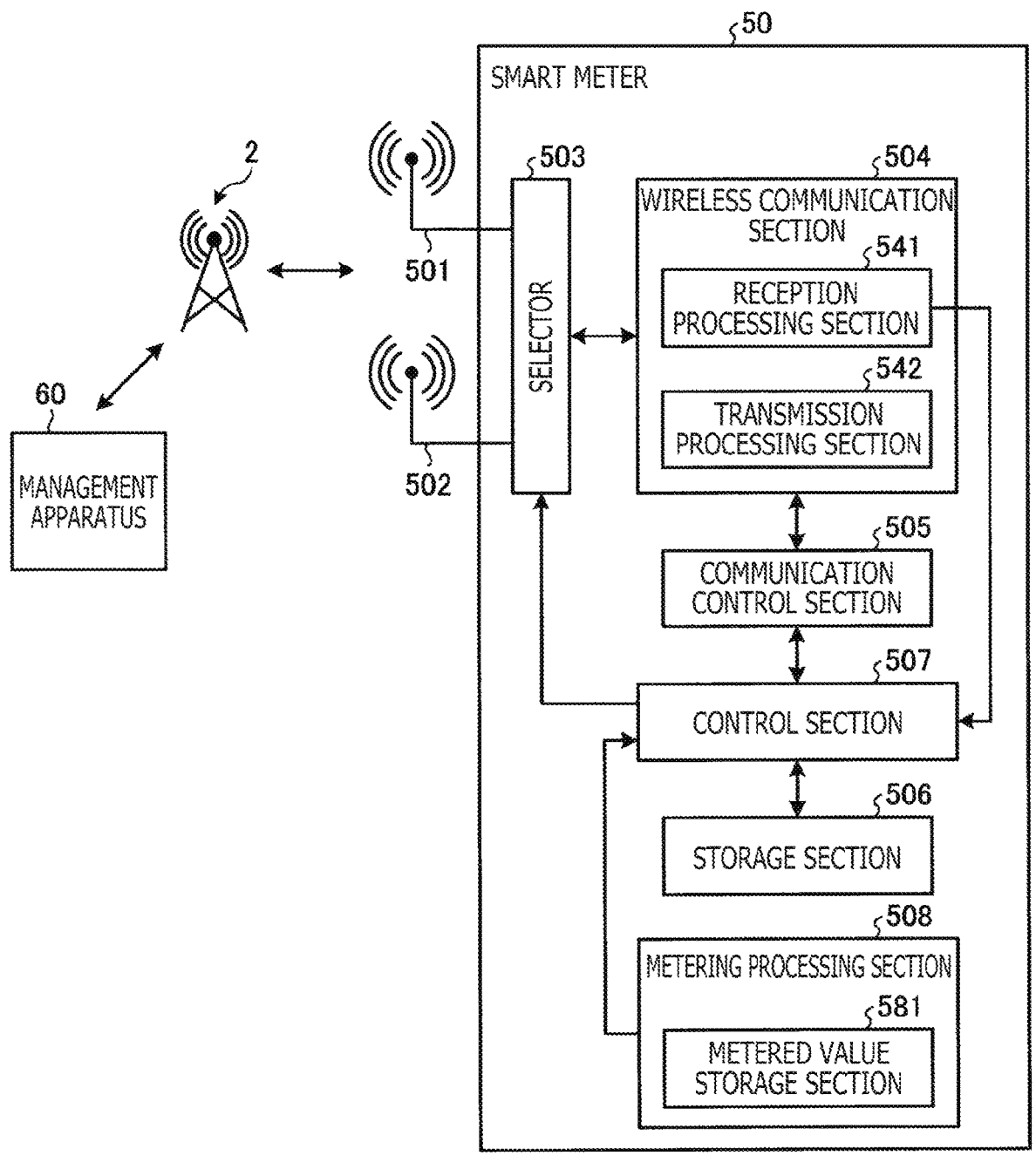
FIG. 10 is a diagram depicting a configuration example of a smart meter according to another embodiment.

The reception apparatus 10 according to the above-described embodiments can be mounted in, for example, a smart meter used as the IoT equipment 3. FIG. 10 is a diagram depicting a configuration example of a smart meter according to another embodiment.

As depicted in FIG. 10, the smart meter 50 includes a first antenna 501, a second antenna 502, a selector 503, a wireless communication section 504, a communication control section 505, a storage section 506, a control section 507, and a metering processing section 508.

The first antenna 501 and the second antenna 502 are apparatuses receiving radio waves compatible with the LTE communication scheme. The first antenna 501 and the second antenna 502 correspond to the first antenna 101 or the second antenna 102 according to the above-described embodiments. The first antenna 501 and the second antenna 502 convert, into electric signals, radio waves received from the base station 2, to acquire reception signals.

The selector 503 corresponds to the selector 103 according to the above-described embodiments and switches to any one of the first antenna 501 and the second antenna 502 according to a control signal from the control section 507.

The wireless communication section 504 is a communication processing section that is compatible with the LTE communication scheme, and the wireless communication section 504 includes a reception processing section 541 and a transmission processing section 542.

The reception processing section 541 performs, on downlink signals corresponding to reception signals, down-conversion, elimination of unnecessary frequency components, control of an amplification level, quadrature demodulation, conversion into a digital signal, elimination of guard intervals, extraction of frequency domain signals by fast Fourier transform, and the like. Various processing functions provided by the reception processing section 541 include processing functions for implementing processing executed by the reception processing section 100, the synchronization signal detection section 109, and the signal quality measurement section 110, which are provided in the reception apparatus 10 described above. As is the case with the reception apparatus 10, the reception processing section 541 includes, for plural antennas (the first antenna 501 and the second antenna 502), a single-system reception circuit that processes reception signals.

The transmission processing section 542 executes transmission processing on uplink data. The transmission processing section 542 execute processing such as conversion into a time domain based on inverse fast Fourier transform, addition of guard intervals, generation of a baseband digital signal, conversion into an analog signal, quadrature modulation, up-conversion, elimination of extra frequency components, and amplification of power. The transmission processing section 542 can provide processing functions for using a predetermined modulation scheme to modulate a data sequence constituting transmission data and generate a modulation signal, oscillating the generated modulation signal at a predetermined frequency for amplification, and then performing filtering to eliminate unnecessary frequency components. The transmission processing section 542 executes transmission processing according to control by the control section 507.

The communication control section 505 is a communication interface that controls communication performed with another apparatus such as a management apparatus 60 via the base station 2. The communication control section 505 is, for example, a LAN interface such as an NIC (Network Interface Card). The communication control section 505 may be a wired interface or a wireless interface. The communication control section 505 functions as network communication means for the smart meter 50. The communication control section 505 communicates with another apparatus such as the management apparatus 60 according to the control by the control section 507.

The storage section 506 stores programs and data used for the control by the control section 507. The storage section 506 is implemented by, for example, a semiconductor memory element such as a RAM or a flash memory, or a storage apparatus such as a hard disk or an optical disc. The storage section 506 can store, for example, a predetermined threshold to be compared, by the control section 507, with a signal quality value calculated by the reception processing section 541.

The control section 507 controls the sections of the smart meter 50. The control by the control section 507 is implemented, for example, by a CPU, an MPU, or the like by executing programs stored inside the smart meter 50 (for example, programs recorded in the storage section 506) with use of a RAM or the like as a work area. The control by the control section 507 may also be implemented, for example, by an integrated circuit such as an ASIC or an FPGA. As is the case with the reception apparatus 10 according to the above-described embodiments, the control section 507 can execute processing for switching between the first antenna 501 and the second antenna 502 on the basis of the signal quality value of a reception signal. The control section 507 can execute processing for uploading, onto the management apparatus 60, data related to the usage of power acquired from the metering processing section 508 described below. Uploading of the data related to the usage of power may be performed at control timings preset in the control section 507 or in response to requests from the management apparatus 60.

The metering processing section 508 is a processing section automatically measuring the usage of electricity at predetermined measurement timings. The metering processing section 508 includes a metered value storage section 581. The metering processing section 508 can measure, for example, data regarding the usage of electricity every 30 or 45 minutes.

The smart meter 50 depicted in FIG. 10 includes the reception processing section 541 including a simplified circuit configuration. Further, the smart meter 50 depicted in FIG. 10 includes the control section 507 performing switching between the antennas on the basis of the signal quality value of a reception signal. Thus, for a smart meter expected to perform for long-term, periodic communication, a product that can deal with changes in communication environment while reducing power consumption can be provided.

Additionally, for the different types of processing described in the above-described embodiments, all or some of those types of processing which have been described as automatically executed can be manually performed, or all or some of those types of processing which have been described as manually executed can be automatically performed using well-known methods. In addition, the processing procedures, specific names, and information including various types of data and parameters described herein or depicted in the drawings can be optionally changed unless otherwise noted. For example, the various types of information depicted in the drawings are not limited to the illustrated information.

Additionally, the components of the illustrated apparatuses are functionally conceptive and need not necessarily be physically configured as illustrated. In other words, specific forms of distribution and integration of the apparatuses are not limited to the illustrated forms and may be configured by functionally or physically distributing and integrating all or some of the apparatuses in any units according to various loads, usage conditions, and the like. For example, the synchronization signal detection section 109, the signal quality measurement section 110, and the control section 112 depicted in FIG. 2 may be functionally or physically integrated. Additionally, instead of the reception apparatus 10 including processing circuits or the like respectively corresponding to the synchronization signal detection section 109 and the signal quality measurement section 110, the control section 112 may implement various types of processing executed by the synchronization signal detection section 109 and various types of processing executed by the signal quality measurement section 110.

In addition, the embodiments and modified examples described above can be combined together as appropriate within a scope not causing contradiction in the contents of processing.

Additionally, the effects described herein are only illustrative and not restrictive, and any other effect may be produced.

In addition, in the above-described embodiments, the base station 2 includes not only a structure having the functions of the base station 2 but also apparatuses installed in the structure. The structure may be, for example, a building such as a high-rise building, a house, a steel tower, a station facility, an airport facility, a port facility, or a stadium. Note that the concept of the structure includes not only the building but also a non-building structure such as a tunnel, a bridge, a dam, a wall, or an iron pillar, or a facility such as a crane, a gate, or a windmill. Additionally, the concept of the structure includes a water-borne structure such as a pier or a mega-float, or an underwater structure such as an oceanographic facility, as well as a ground (land) or underground structure.

Additionally, the base station 2 may be a movably-configured base station apparatus. For example, the base station may be an apparatus installed in a moving body or the moving body itself. The moving body may be a mobile terminal such as a smartphone. In addition, the moving body may move on the ground (land) (for example, a vehicle such as an automobile, a bus, a truck, a train, or a linear motor car) or may move under the ground (for example, through a tunnel) (for example, a subway). Additionally, the moving body may move on the water (for example, a ship such as a passenger ship, a cargo ship, or a hovercraft) or may move underneath the water (for example, a submersible ship such as a submersible vessel, a submarine, or an autonomous underwater vehicle). In addition, the moving body may move through the atmosphere (for example, an aircraft such as an airplane, an airship, or a drone) or may move above the atmosphere (for example, an artificial astronomical body such as an artificial satellite, a spacecraft, a space station, or a probe).

5. Effects Produced by Reception Apparatus 10 According to Present Disclosure As described above, the reception apparatus according to the present disclosure (reception apparatus 10 in the embodiments or the like) includes plural antennas that are compatible with the LTE communication scheme and one reception processing section that processes reception signals acquired by any one of the plural antennas. Thus, the reception apparatus according to the present disclosure simplifies a configuration for processing reception signals, enabling a reduction in power consumption. Additionally, the reception apparatus according to the present disclosure can deal with changes in communication environment by using the plural antennas.

Additionally, the reception apparatus according to the present disclosure further includes a signal quality measurement section and a control section. The signal quality measurement section uses, as a trigger, detection of a synchronization signal used during an initial cell search, to calculate a signal quality value indicative of the quality of a reception signal acquired by the antenna during the initial cell search. In a case where the signal quality value is less than a predetermined threshold, the control section performs switching between the antennas. Thus, by switching the antenna on the basis of a signal quality indicative of quality of a reception signal, the reception apparatus according to the present disclosure can prevent degradation of communication quality involved in changes in communication environment.

Additionally, the signal quality measurement section calculates the signal quality value on the basis of a result of calculation using at least any one of an RSSI value, an RSQI value, and an SINR value, and a value associated with the RSSI value, a value associated with the RSQI value, and a value associated with the SINR value. This allows the reception apparatus according to the present disclosure to use signal quality values based on various indicators.

Additionally, the plural antennas include a first antenna and a second antenna. The signal quality measurement section calculates the signal quality value again after switching to the second antenna. In a case where the signal quality value calculated by the signal quality measurement section again after switching to the second antenna is less than the signal quality value calculated by the signal quality measurement section before switching to the second antenna, the control section performs switching to the first antenna. This allows the reception apparatus according to the present disclosure to perform communication using an antenna that provides reception signals of quality as high as possible.

Additionally, the plural antennas include a first antenna and a second antenna. The signal quality measurement section calculates the signal quality value again after switching to the second antenna. In a case where the signal quality value calculated by the signal quality measurement section again after switching to the second antenna is equal to or greater than the signal quality value calculated by the signal quality measurement section before switching to the second antenna, the control section sets the second antenna as the reference antenna. Before performing the initial cell search, the control section connects to the second antenna and waits. This allows the reception apparatus according to the present disclosure to increase the possibility of dealing with gradual changes in the environment of the transmission path.

Additionally, the control section uses, as a trigger, the lack, for a given period of time, of detection of the synchronization signal used during the initial cell search, to perform switching between the antennas. This allows the reception apparatus according to the present disclosure to deal with a situation where a sudden change in the environment of the transmission path causes loss of synchronism with the base station.

Additionally, the first antenna and the second antenna acquire reception signals based on a low-speed communication scheme equivalent to the CAT-M1 scheme and the NB-IoT scheme. This allows the reception apparatus according to the present disclosure to minimize power consumption, enabling long-term communication to be implemented.

In addition, an antenna control method according to the present disclosure includes, for example, antenna switching processing executed by the reception apparatus 10 according to the embodiments. In the antenna control method, a computer uses, as a trigger, detection of a synchronization signal used during an initial cell search, to calculate a signal quality value indicative of quality of a reception signal acquired by an antenna used during the initial cell search. Then, in a case where the signal quality value is less than a predetermined threshold, the computer performs switching between the antennas. This allows the antenna control method according to the present disclosure to prevent degradation of communication quality involved in a change in the environment of a transmission path, while reducing power consumption.

Additionally, a communication system according to the present disclosure (for example, the communication system 1 in the embodiment) includes a base station and a reception apparatus. The reception apparatus in the communication system includes plural antennas that are compatible with the LTE communication scheme and one reception processing section processing a reception signal acquired by any one of the plural antennas. This allows the communication system according to the present disclosure to simplify the configuration of the reception apparatus that processes reception signals, thus enabling a reduction in the power consumption of the reception apparatus. Additionally, in the communication system according to the present disclosure, the reception apparatus including the plural antennas can deal with changes in the environment of the transmission path.

6. Hardware Configuration

The reception apparatus 10 according to the above-described embodiments is implemented by, for example, a computer 1000 configured as depicted in FIG. 11. The reception apparatus 10 according to the first embodiment will be described below by way of example. FIG. 11 is a hardware configuration diagram depicting an example of the computer 1000 implementing the functions of the reception apparatus 10. The computer 1000 includes a CPU 1100, a RAM 1200, a ROM (Read Only Memory) 1300, an HDD (Hard Disk Drive) 1400, a communication interface 1500, and an input/output interface 1600. The sections of the computer 1000 are connected together by a bus 1050.

The CPU 1100 operates on the basis of programs stored in the ROM 1300 or the HDD 1400, to control the sections of the computer 1000. For example, the CPU 1100 loads the programs stored in the ROM 1300 or the HDD 1400 into the RAM 1200 and executes processing corresponding to the various programs.

The ROM 1300 stores a boot program such as a BIOS (Basic Input Output System) which is executed by the CPU 1100 when the computer 1000 is activated, programs dependent on the hardware of the computer 1000, and the like.

The HDD 1400 is a recording medium in which programs executed by the CPU 1100, data used by the programs, and the like are non-transitorily recorded and from which the computer 1000 can read the programs, the data, and the like. Specifically, the HDD 1400 is a recording medium in which, for example, a program for implementing the antenna switching processing depicted in FIG. 3 is recorded.

The communication interface 1500 is an interface via which the computer 1000 connects to an external network 1550 (for example, the Internet). For example, the CPU 1100 performs, via the communication interface 1500, reception of data from another piece of equipment and the transmission, to the other piece of equipment, of data generated by the CPU 1100.

The input/output interface 1600 is an interface for connection between an input/output device 1650 and the computer 1000. For example, the CPU 1100 receives data from input devices such as a keyboard and a mouse via the input/output interface 1600. Additionally, the CPU 1100 transmits data to output devices such as a display, a speaker, and a printer via the input/output interface 1600. In addition, the input/output interface 1600 may function as a media interface that reads programs and the like recorded in a predetermined recording medium (media). The media include, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, a semiconductor memory, and the like.

For example, in a case where the computer 1000 functions as the reception apparatus 10 according to the first embodiment, the CPU 1100 of the computer 1000 executes a program loaded onto the RAM 1200 (program for implementing the antenna switching processing or the like). Thus, functions such as various types of processing which are executed by the control section 112 of the reception apparatus 10 are implemented. Additionally, the HDD 1400 stores the program for implementing the antenna switching processing according to the present disclosure, data stored in the storage section 111, and the like. Note that the CPU 1100 reads program data 1450 from the HDD 1400 for execution but, in another example, the CPU 1100 may acquire these programs from another apparatus via the external network 1550.

Note that the present technique can also take the following configurations.

(1)
A reception apparatus including:
plural antennas that are compatible with an LTE communication scheme; and
one reception processing section that processes a reception signal acquired by any one of the plural antennas.

(2)
The reception apparatus according to (1) described above, further including:
a signal quality measurement section using, as a trigger, detection of a synchronization signal used during an initial cell search, to calculate a signal quality value indicative of quality of the reception signal acquired by a corresponding one of the antennas used during the initial cell search; and
a control section performing switching the antenna to another one of the antennas in a case where the signal quality value is less than a predetermined threshold.

(3)
The reception apparatus according to (2) described above, in which the signal quality measurement section calculates the signal quality value on the basis of a result of calculation using at least one of an RSSI value, an RSQI value, and an SINR value and at least one of a value associated with the RSSI value, a value associated with the RSQI value, and a value associated with the SINR value.

(4)
The reception apparatus according to (2) or (3) described above, in which
the plural antennas include a first antenna and a second antenna,
the signal quality measurement section calculates the signal quality value again after switching to the second antenna, and,
in a case where the signal quality value calculated by the signal quality measurement section again after switching to the second antenna is less than the signal quality value calculated by the signal quality measurement section before switching to the second antenna, the control section performs switching to the first antenna.

(5)
The reception apparatus according to (2) or (3) described above, in which
the plural antennas include a first antenna and a second antenna,
the signal quality measurement circuit calculates the signal quality value again after switching to the second antenna, and,
in a case where the signal quality value calculated by the signal quality measurement section again after switching to the second antenna is equal to or greater than the signal quality value calculated by the signal quality measurement section before switching to the second antenna, the control section sets the second antenna as a reference antenna, and, before performing the initial cell search, the control section connects to the second antenna and waits.

(6)
The reception apparatus according to any one of (1) to (5) described above, in which the control section uses, as a trigger, lack, for a given period of time, of detection of the synchronization signal used during the initial cell search, to perform switching between the antennas.

(7)
The reception apparatus according to (4) described above, in which the first antenna and the second antenna acquire reception signals based on the LTE communication scheme using a low-speed communication scheme equivalent to a CAT-M1 scheme and an NB-IoT scheme.

(8) An antenna control method including:
by a computer,
using, as a trigger, detection of a synchronization signal used during an initial cell search, to calculate a signal quality value indicative of quality of a reception signal acquired by an antenna used during the initial cell search; and
performing switching the antenna to another antenna in a case where the signal quality value is less than a predetermined threshold.

(9) A communication system including:
a base station; and
a reception apparatus, in which
the reception apparatus includes
plural antennas that are compatible with an LTE communication scheme, and
one reception processing section that processes a reception signal acquired by any one of the plural antennas.

REFERENCE SIGNS LIST

1: Communication system
10: Reception apparatus
101: First antenna
102: Second antenna
103: Selector
104: Amplifier
105: Mixer
106: Baseband processing section
107: Conversion section
108: Demodulation section
109: Synchronization signal detection section
110: Signal quality measurement section
111: Storage section
112: Control section
113: Timer

The invention claimed is:

1. A reception apparatus comprising:
plural antennas configured to be compatible with a long-term evolution (LTE) communication scheme;
one reception processing section configured to process a reception signal acquired by any one of the plural antennas;
a signal quality measurement section configured to use, as a first trigger, detection of a synchronization signal used during an initial cell search, to calculate a signal quality value indicative of quality of the reception signal acquired by a corresponding one of the antennas used during the initial cell search; and
a control section configured to:
perform switching of the antenna to another one of the antennas based on the signal quality value being less than a specific threshold, and
use, as a second trigger, lack of detection of the synchronization signal for a given period of time during the initial cell search, to perform switching between the antennas.

2. The reception apparatus according to claim 1, wherein the signal quality measurement section is further configured to calculate the signal quality value based on a result of calculation based on at least one of a received signal strength indicator (RSSI) value, a received signal quality indicator (RSQI) value, or a signal to interference plus noise ratio (SINR) value and at least one of a value associated with the RSSI value, a value associated with the RSQI value, or a value associated with the SINR value.

3. The reception apparatus according to claim 1, wherein the plural antennas include a first antenna and a second antenna,
the signal quality measurement section is further configured to calculate the signal quality value again after switching to the second antenna, and
based on the signal quality value calculated by the signal quality measurement section again after switching to the second antenna being less than the signal quality value measured by the signal quality measurement section before switching to the second antenna, the control section is further configured to perform switching to the first antenna.

4. The reception apparatus according to claim 1, wherein the plural antennas include a first antenna and a second antenna,
the signal quality measurement section is further configured to calculate the signal quality value again after switching to the second antenna, and
based on the signal quality value calculated by the signal quality measurement section again after switching to the second antenna is equal to or greater than the signal quality value measured by the signal quality measurement section before switching to the second antenna, the control section is further configured to set the second antenna as a reference antenna, and before performing the initial cell search, the control section is further configured to connect to the second antenna and wait.

5. The reception apparatus according to claim 3, wherein the first antenna and the second antenna are configured to acquire reception signals based on a low-speed communication scheme equivalent to a category-M1 (CAT-M1) scheme and a narrowband internet of things (NB-IoT) scheme.

6. An antenna control method, comprising:
by a computer,
using, as a first trigger, detection of a synchronization signal used during an initial cell search, to calculate a signal quality value indicative of quality of a reception signal acquired by an antenna used during the initial cell search; and
performing switching the antenna to another antenna in a case where the signal quality value is less than a predetermined threshold; and
using, as a second trigger, lack, for a given period of time, of detection of the synchronization signal used during the initial cell search, to perform switching between the antennas.

7. A communication system comprising:
a base station; and
a reception apparatus, wherein the reception apparatus includes:
plural antennas configured to be compatible with a Long-Term Evolution (LTE) communication scheme,
one reception processing section configured to process a reception signal acquired by any one of the plural antennas,
a signal quality measurement section configured to use, as a first trigger, detection of a synchronization signal used during an initial cell search, to calculate a signal quality value indicative of quality of the reception signal acquired by a corresponding one of the antennas used during the initial cell search, and a control section configured to:
- perform switching the antenna to another one of the antennas in a case where the signal quality value is less than a predetermined threshold, and
- use, as a second trigger, lack of detection of the synchronization signal for a given period of time during the initial cell search, to perform switching between the antennas.

* * * * *